Oct. 23, 1934.    G. GASTRICH    1,978,259
ELASTIC BRAIDED ARTICLE AND METHOD OF MAKING THE SAME
Filed July 31, 1933    3 Sheets-Sheet 1
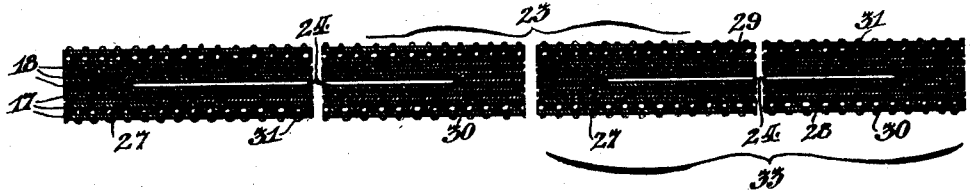
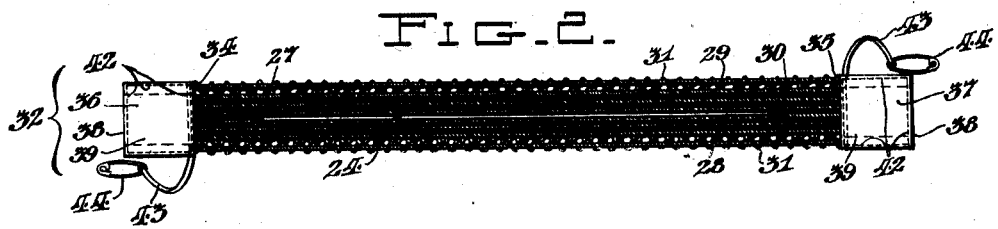
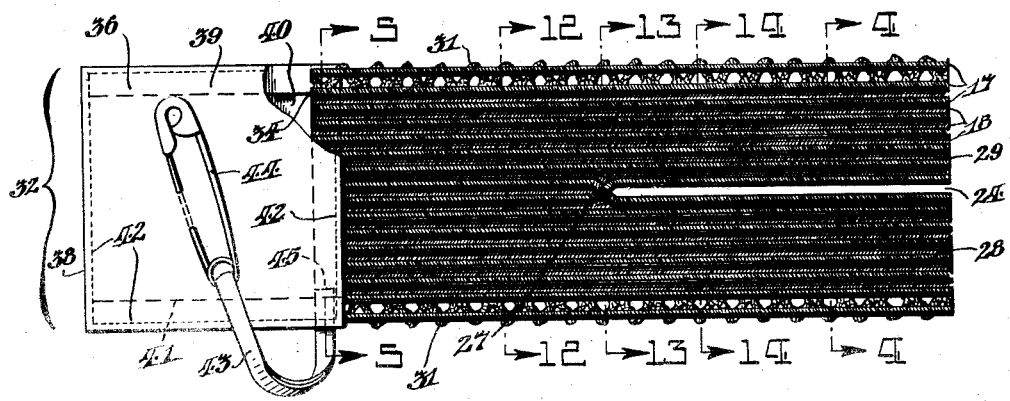
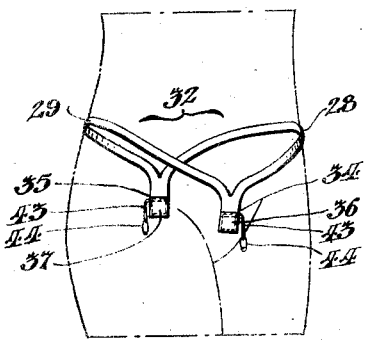
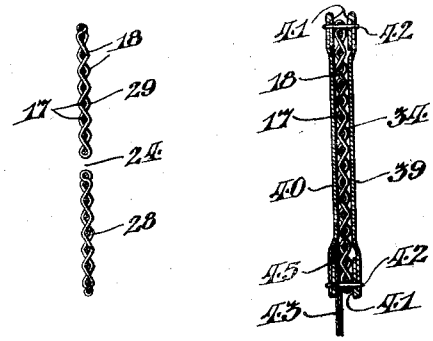
INVENTOR:
Gustav Gastrich,
BY
ATTORNEY.

Oct. 23, 1934.  G. GASTRICH  1,978,259
ELASTIC BRAIDED ARTICLE AND METHOD OF MAKING THE SAME
Filed July 31, 1933    3 Sheets—Sheet 2
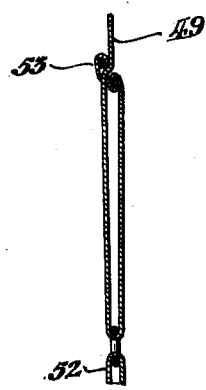
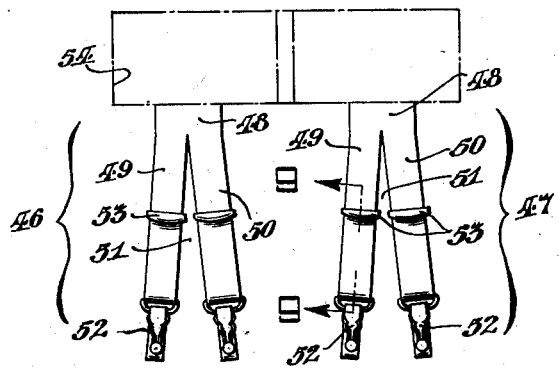
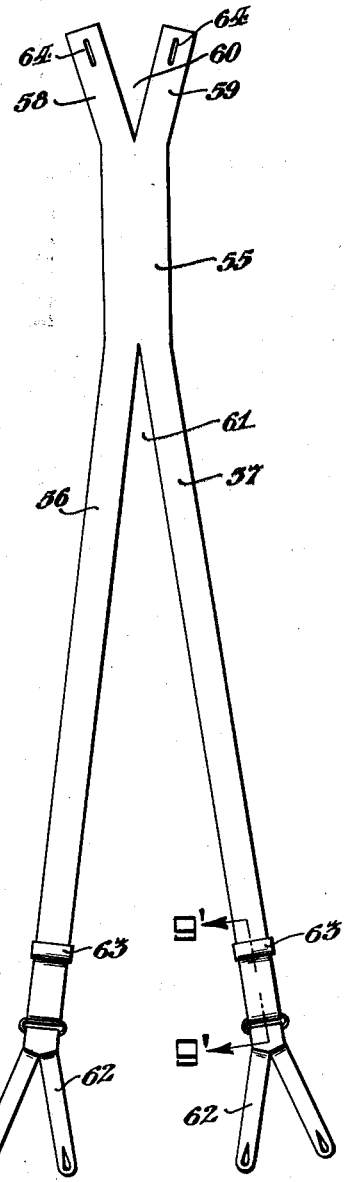
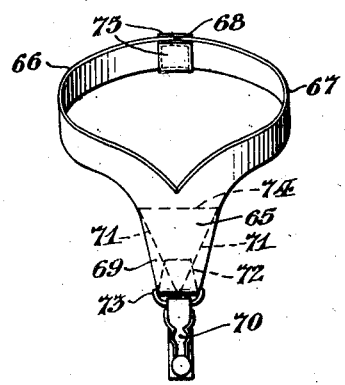
INVENTOR:
Gustav Gastrich,
BY Alfred E. Tschinger
ATTORNEY.

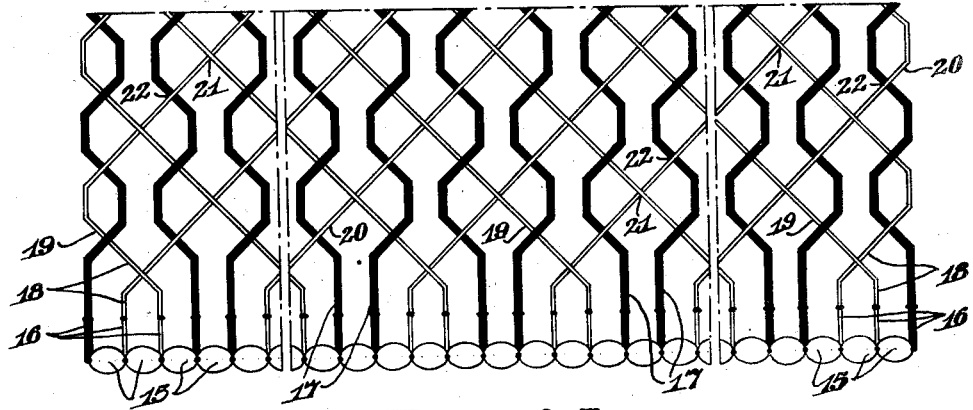
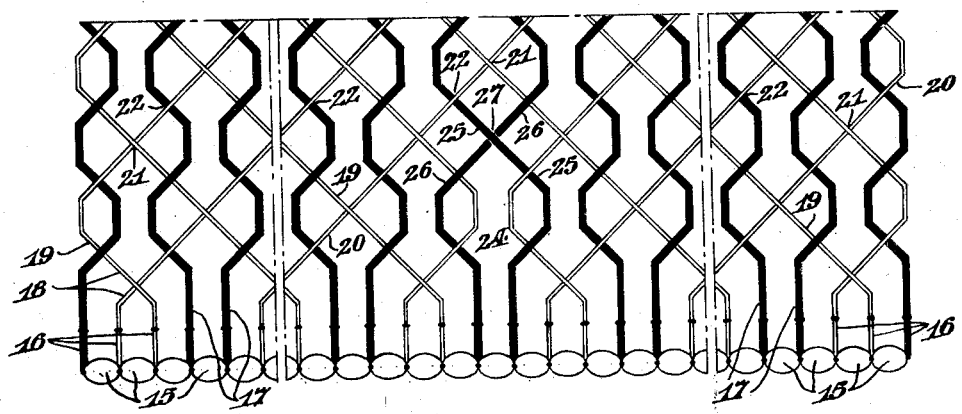
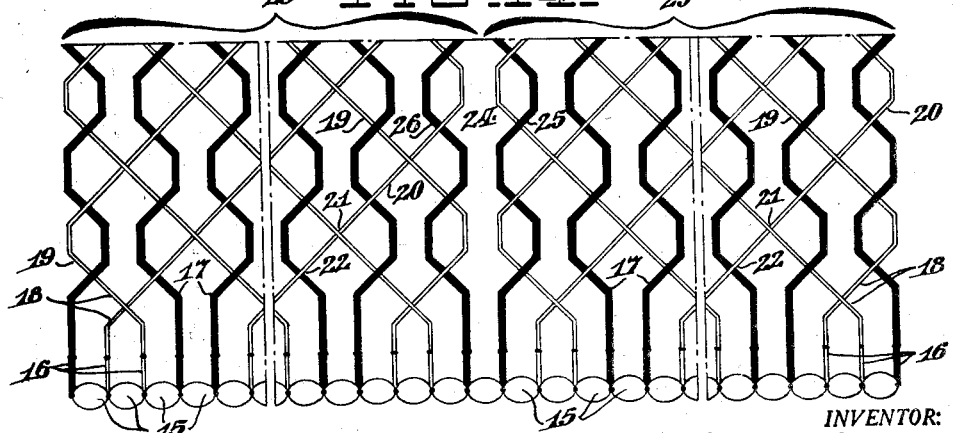

Patented Oct. 23, 1934

1,978,259

UNITED STATES PATENT OFFICE 1,978,259

ELASTIC BRAIDED ARTICLE AND METHOD OF MAKING THE SAME

Gustav Gastrich, Wyomissing, Pa., assignor to Textile Machine Works, Wyomissing, Pa., a corporation of Pennsylvania Application July 31, 1933, Serial No. 682,961

13 Claims. (Cl. 96—25)

This invention relates to the manufacture of elastic fabrics and articles produced therefrom, and more particularly to a new and improved method of braiding elastic fabrics whereby the same are capable of a wide range of improved use in the production of certain standard articles of manufacture in which elastic braid or the like generally constitutes an essential factor.

Elastic braid fabrics as heretofore produced have generally been of relatively narrow width and composed of interbraided longitudinally extending elastic and transversely extending inelastic strands, as shown, for instance in Patent No. 1,717,215 granted June 11, 1929, to O. E. Huber. Such braids have been largely used as garter and belt elastic and the like.

In other instances the elastic braid fabrics have been made with both longitudinally and transversely extending elastic strands, as shown in Huber's Patent No. 1,887,643 of November 15, 1932. These fabrics have been particularly suitable for use as expansibility imparting inserts in corsets and other garments where it is desirable that expansion occur in different directions.

Certain articles of wearing apparel or accessories which necessarily or desirably include elastic portions such as certain garment supporters (for instance, garters, supporters, belts, suspenders and the like), include a plurality of sections or portions so constituted that a plurality of pieces of elastic fabric have heretofore had to be sewed or otherwise attached together, with the result that the seams have broken the elastic strands, or have otherwise affected the elastic qualities of the article and, as well, have made the same more or less expensive, bulky in construction and uncomfortable to wear, as well as detracting from their appearance.

The present invention embodies certain improvements upon the elastic fabrics and methods disclosed in the aforesaid patents; and one object is to provide a novel elastic fabric, in this instance braided, in which the elastic strands extend longitudinally, with the inelastic strands extending transversely in interlaced relation with each other as well as with the elastic strands, entirely across the width of the fabric for part of the length of the fabric; and, in another portion extending part way across the width of the fabric, without interlacement with each other so as to form a portion composed of separate sections, with adjacent elastic strands crossing each other at the point of commencement of such uninterlaced separate sections. Thus, the fabric is separated or divided for any desired portion of its length and the bifurcations may be rejoined at any desired point by another crossing of the adjacent elastic strands and continued interlacement of the inelastic strands with each other, and with the elastic strands, entirely across the width of the fabric.

The braid may thus be produced in a continuous piece of any length with the aforesaid special sectional portions repeated at spaced intervals; the division being of any desired length according to the intended use of the finished elastic braid or the article to be produced therefrom.

Another object of the invention is the production of an elastic braid of the kind just referred to by an improved method employable with conventional jacquard controlled braiding machines.

Still another object is to provide an elastic braid adapted for use in certain novel articles of manufacture. In this connection the braid of the invention provides novel elastic accessories of the belt and garter types; more particularly, a sanitary pad supporter belt in which the longitudinal opening in a portion of the elastic braid fabric forms the separated sections into a body encircling belt; a pair of garters in which the fastener holding strap portions are integrally joined at their upper ends; a pair of suspenders in which the front and back straps are formed integrally with a central back part; and a hookless hose supporter of one-piece construction.

With these and other objects in view, which will become apparent from the following detailed description of several illustrative embodiments of the invention shown in the accompanying drawings, the invention resides in the novel fabrics, and method of producing the same, as hereinafter more particularly pointed out in the claims.

In the drawings:

Fig. 1 is a top plan view partly broken away, of the present elastic fabric as produced on the braiding machine.

Fig. 2 is a top plan view of an article of manufacture, in this instance a sanitary pad holder, made from the braid of the present invention.

Fig. 3 is a slightly enlarged plan view of an end portion of the article shown in Fig. 2.

Figs. 4 and 5 are transverse sectional views taken respectively on the lines 4—4 and 5—5, Fig. 3.

Fig. 6 is a perspective view showing the article of Figs. 2 to 5 inclusive as it appears in use on the wearer.

Fig. 7 is a partial top plan view illustrating a modification of the crossed elastic crotch construction.

Fig. 8 is a plan view of another article of manufacture, in this instance a pair of double garters, made in accordance with the invention.

Fig. 9 is a vertical sectional view taken on the line 9—9 of Fig. 8 and is also illustrative of the section indicated by the line 9'—9' of Fig. 10.

Fig. 10 is a plan view of still another article produced in accordance with the invention.

Fig. 11 is a perspective view of still another modification of the invention.

Figs. 12, 13 and 14 are diagrammatic face views of different portions of the elastic braid fabric illustrating the manner in which the various strands are interbraided at the points indicated by the sectional lines 12—12, 13—13 and 14—14, respectively, of Fig. 3.

The present improved method of producing the novel elastic braid is carried out with the aid of a well known jacquard controlled single thread braiding machine of the type referred to, for instance, in U. S. Patent No. 979,770 issued December 27, 1910 to Gustav Krenzler, in which the different bobbins or yarn carriers travel about one or more tellers or quoits, to form a finished fabric of closed or open lace-like mesh as determined by pattern directed jacquard mechanism. While such a machine is perhaps best suited for this purpose, it will be understood that other machines, well known, may be utilized for this purpose; for example, the "two thread", "three thread" and like machines.

Referring to the schematic illustration of Figs. 12, 13 and 14 of the drawings, each of said views represents the top plate of such a known braiding machine, upon which the tellers or quoits 15 are intermittently rotated under the control of the usual jacquard mechanism (not shown) to traverse the bobbins or yarn carriers, diagrammatically indicated at 16, some of which are adapted at times to remain on one teller and merely rotate therewith, while others pass to adjacent tellers and back again, and still others traverse the whole series of tellers, all in well known manner and in accordance with the selected pattern directing the jacquard mechanism.

Two different kinds of strands, designated 17 and 18, are employed in carrying out the production of the braid in accordance with the invention; and these are carried by the various bobbins 16. The strands 17 are elastic, and desirably have a corded or braided outer covering.

The strands 18 are in the present instance, inelastic and preferably, but not necessarily, glossy. They may be of any desired material, such as linen, silk, cotton or the like, and in the present instance function as binder strands. When these are united with the elastic strands, as hereinafter explained, they impart to the fabric the desired amount of the body and generally enhance its appearance. Of course, the strands 18 may also be elastic if desired.

The strands 17 and 18 may be of any desired color or combination of colors, and are traversed, as heretofore, to form the braid construction and pattern illustrated in Figs. 1 to 5, inclusive.

In producing this pattern and construction the bobbins 16 carrying the comparatively fine inelastic strands 18 interbraid their strands with the coarser elastic strands 17 as clearly shown in Figs. 12 to 14, inclusive. Referring to Fig. 12, it will be seen that the bobbins carrying the elastic strands 17 are traversed by the tellers 15 so as to extend the elastic strands longitudinally of the fabric, while the other bobbins carry the inelastic strands of the fabric, each adjacent pair of the latter bobbins moving in opposite directions, to carry the strands, after first crossing each other, toward the opposite sides of the fabric, as indicated at 19 and 20, respectively. These strands, during such bobbin passage, are accompanied by crossing and interbraiding of the inelastic strands with the longitudinally extending elastic strands and with the oppositely extending inelastic strands.

Such crossing and interbraiding in this instance occurs so that the inelastic strands which are moved in the direction indicated by the numeral 19 first pass over an adjacent inelastic strand moving toward the opposite side, then beneath the elastic strand next encountered, then over the next inelastic strand, and so on until the outermost elastic strand is met, whereupon the course of the strand is reversed so that it moves toward the opposite side of the fabric, passing first around the outermost elastic strand, then beneath the next strand moving in direction 19, then over the next strand, and so on in the direction indicated by numeral 20. Thereupon the inelastic strand repeats the cycle just described.

During said cycle the adjacent inelastic strands indicated as initiating their travel in the direction indicated by the numeral 20 pursue a course corresponding to the return travel of the inelastic strand first described as moving toward the side indicated by the numeral 20, which course is then reversed in a manner similar to that of the inelastic strand movement, first described.

That is to say, all inelastic strands in moving toward one side, say the side indicated by 19, pass over all oppositely moving inelastic strands which they encounter as seen at 21 and beneath all elastic strands; and during their reverse movement toward the side indicated by 20, pass over all elastic strands encountered as seen at 22 and beneath all inelastic strands.

Thus the fabric is homogeneously built up, so that the elastic strands are joined or fixedly locked against creeping relatively to each other without affecting the elasticity of the fabric. To insure the maximum longitudinal elasticity in the fabric thus produced, the elastic strands are especially tensioned so as to increase their length during the braiding operation and thereby maintain them in a substantially straight line from the carriers to the braiding point; the inelastic strands being under slight or normal braiding tension during the interbraiding action.

In carrying out the present invention for production of the braided fabric indicated by the numeral 23 in Fig. 1, the fabric, at any desired portion in its length, is provided with a division or opening, indicated at 24, for use in producing the novel articles of manufacture already referred to and hereinafter described in detail.

The dual braided portion of the fabric 23 extending along the sides of the division or opening 24 is produced during the braiding operation, the same being initiated and terminated at any desired predetermined point, under control of the jacquard mechanism. The division of the fabric is commenced by altering the travel of the carriers so that those carrying the elastic strands, 25 and 26 which are located at opposite sides of the point where the division is to take place, are caused to cross each other's path, as clearly seen at 27 in Fig. 13, and also in Figs. 1 to 3, inclusive; and the inelastic strands traveling in each direction are at the same time caused to reverse their travel immediately after encountering the first of the strands 25 or 26 instead of passing to the outer side of the fabric. The operation of the inelastic strands thereafter results in the production of a dual braided fabric, characterized by sections 28 and 29 separated from each other but integral with the main body of the fabric 23.

The opening or division 24 may extend for any desired length, after which the sections 28 and 29 are rejoined by a recrossing of the elastic strands 25 and 26 as indicated at 30 in Figs. 1 and 2, the inelastic strands being at the same time caused to resume their travel entirely across the width of the braided fabric instead of reversing their movement at the division 24.

The division 24 may be located in any desired spaced relationship with the respective outer sides of the fabric 23 and may be repeated at any desired predetermined interval or intervals during the braiding of the fabric.

Each of the sections 28 and 29 is formed as a completely braided unit, both sides of each unit 28 and 29 being substantially alike. The outer sides of the complete elastic fabric 23 may be provided with a decorative lace edge binding or trimming as seen at 31 in Figs. 1 to 3 inclusive, and this latter may also be provided for the opposing edges of the portions 28 and 29, in producing any of the articles of manufacture hereinafter referred to or others. Such edging is producible on the machine during the braiding operation, in known manner.

It will be noted that, depending on the gauge of the elastic and inelastic strands, more or less body will be imparted to the fabric, and that these latter strands in this instance are present in the fabric in substantial quantity so that they also materially affect the appearances or surface effect of the fabric. The fabric may, however, be of more open, lace-like construction, if desired.

When the braided fabric is removed from the braiding machine the elastic strands at once retract to their normal unstretched length, reducing the length of the finished fabric, and causing the inelastic strands to assume relaxed positions between or about the elastic strands, which latter maintain their longitudinal positions as there is no distorting strain thereon.

It is to be understood that the longitudinally extending elastic strands may be laid in any desired spaced relationship; and that instead of crossing two elastic strands to produce the division and opening 24, a plurality of elastic strands at each side of the opening may be so crossed, which will have the effect of further strengthening and reinforcing the crotch portion at the crossing 27. Similarly, as seen at 27' in Fig. 7 a pair of adjacent elastic strands 17' may be crossed a plurality of times, which will also materially strengthen and reinforce the crotch portion of the fabric 23' at the sectional division 24'. Such reinforcement is particularly useful in articles such as shown in Fig. 10 where the divided sections may at times be under considerable strain.

Also, instead of dividing the fabric into two parts at a portion of its length, the same may be divided into three or more parts, and any of the divisions or parts may be subdivided at a subsequent point in the braiding operation, to produce any desired number of elastic appendages or the like for any purpose for which the same may be applicable.

The novel elastic braid as described herein is adaptable to the construction of articles of manufacture for numerous purposes, and as such to function in a manner superior to that of prior constructions.

For instance, Figs. 2 to 6 inclusive illustrate a novel construction for an article of manufacture in the form of a sanitary pad supporter belt 32 which in its finished form is adapted to be worn as shown in Fig. 6. For this purpose the body of the fabric 23, provided with a plurality of succeeding openings or divisions 24, is severed between such portions to produce a plurality of individual blanks 33. Each of said blanks, having the open or divided portion 24, is adapted to constitute the body portion of such an article of manufacture, as seen at 32 in Figs. 2 and 3, the ends 34 and 35 being adapted to receive tab portions 36 and 37, respectively, for attachment of a sanitary pad or the like (not shown), and the side sections 28 and 29, separated by the opening 24 being adapted when spaced apart to constitute body encircling belt portions, as clearly seen in Fig. 6.

As seen in Figs. 3 and 5, the tab portion 36 (and also the tab portion 37) is preferably constructed of a suitable strip of woven fabric material, such as satin, silk or cotton, folded upon itself along an outer edge 38, the front and rear portions 39 and 40, respectively, having their side edges folded inwardly upon themselves and their respective inner edges turned inwardly against the end of the elastic fabric, as indicated generally by the numeral 41, and secured together by suitable stitching 42. During the latter operation the ends of a short length of tape or the like, indicated at 43, the looped portion of which supports a safety pin 44, are attached to each of the tab portions 36 and 37, as indicated at 45. The pins 44 are thus supported against loss when not engaged in their intended purpose of securing the sanitary pad or napkin in place at the tabs 36 and 37.

The construction just described includes many advantages in that the divided, one-piece construction of the elastic braid avoids the necessity for stitching various parts of a sanitary belt or the like together, which latter has not only resulted in cutting the elastic threads of the fabric, and thus destroying its utility, but has also produced bulges, roughness and other chafing and uncomfortable non-uniformities at the body engaging surfaces of the belt.

The present supporter belt lies flat and smooth upon the body, with full stretch of the elastic at all points without binding or chafing.

Particularly important is the construction of the crotch portion of the elastic, indicated alternatively at 27 and 27', in that the side sections 28 and 29, when spread apart, are afforded an even pull on the elastic at all points lengthwise as well as around the several contours of the body of the wearer, with a maximum of yieldability during the wearer's bodily movements during which the construction of the belt enables the latter to assume various angles and directions to closely fit the wearer's body at both front and back as well as at the hips.

Also, the crotch construction just referred to affords strength as a reinforcement at the commencement of the bifurcated portion of the elastic fabric, inasmuch as the elastic strands, crossed once or a plurality of times, covered as they generally are by braiding or the like and closely backed up by adjacent inelastic but nevertheless expansible strands, are able to give sufficiently under tensional strains. This has not always been the case with belt constructions the several sections of which have been secured together at vital points by stitching or equivalent separate fastening means.

Still another advantage of the present construction is the feature of economy in production, since the formation of the body portion 33 entirely upon the braiding machine eliminates several operations incidental to sewing or otherwise securing various parts of the belt together.

Figs. 8 and 9 illustrate another type of article producible from the braid of this invention. In this instance the elastic braid produced as indicated at 23 in Fig. 1 has been formed into a pair of double garters, designated 46 and 47. As will be clear from the description already given, a section of the elastic braid designated 48 is desirably formed with relatively long side sections 49 and 50, which are separated at one end of the elastic braid, as by severing the braid section 48 transversely at a suitable point across the opening 51 between the side sections. The tab portions 49 and 50 thus formed are adapted to receive suitable garter fasteners 52 and adjustable clasps 53, in conventional manner.

The construction of the pair 46 is similar to that of the pair 47 and both pairs of garters are adapted to be secured to any suitable body encircling garment as indicated at 54.

The unitary garters shown in Fig. 8 possess the same advantages as to smoothness, strength, stretchability in different directions and economy in manufacture as the belt supporter construction shown in Figs. 2 to 6 inclusive.

Still another article producible from the braid of the invention is shown in Fig. 10 which illustrates a novel construction of garment suspenders of which the body portion 55, the shoulder straps 56 and 57 and rear tab portions 58 and 59 are all formed in one piece, from a section of the elastic braid fabric 23 which, as will be clear from the drawings, has been severed transversely at longitudinal openings 60 and 61 formed at opposite ends of the full width braided portion 55. The front tab 62 and clasp 63 are in this instance attached to the free ends of the side sections 56 and 57, which form the shoulder straps, in the same manner as the fasteners 52 and clasps 53 shown in Figs. 8 and 9.

The construction shown in Fig. 10 possesses advantages in all essential respects similar to those of the other forms of the invention shown herein. As will be obvious, a great advantage is the unitary construction with an unencumbered central back portion.

A still further modification of the invention is embodied in the construction shown in Fig. 10, in that the buttonholes 64 are formed by crossing of the elastic strands 17 in the same manner as the open portion 24, 51, 60 and 61.

The articles illustrated herein are intended to disclose different ways of carrying out the invention. It will be noted for instance, that one form (Figs. 2 to 6, inclusive) discloses an article produced from a section of elastic braid the opening of which is connected at both ends by the crossed elastic strands; another form (Figs. 8 and 9) in which the opening is unconnected, or the braid severed at one end; and a further development, (Fig. 10) in which the braid blank employed is provided with longitudinally divided and transversely severed sections at opposite ends of a full width braid portion.

Fig. 11 illustrates how the invention is applied to a hose supporter of the type adapted to fit above the calf of the wearer. In this instance a section of the elastic braid similar to that shown at 33 in Fig. 1 is severed across the opening 24 to produce a bifurcated body including a central elastic braid body portion 65 (see Fig. 11) and integral elastic braid appendages 66 and 67. The ends of the appendages may be joined at 68 by one or more overlapping pieces 75 as by stitching or otherwise. The outer or lower part 69 of the central portion 65 is provided with a conventional fastener 70; the sides of the lower portion 69 being turned in at the sides and bottom as indicated at 71 and 72, respectively, for neatness as well as for reinforcement purposes in securing the loop 73 of the fastener 70. The inturned portions 71 and 72 are preferably sewed against the under side of the portion 69 and a suitable fabric protective covering 74 applied over the inturned portions.

This hose supporter includes advantages over the conventional type which is clasped around the leg as well as to the hose, in that it is simply necessary in this instance to draw the supporter over the foot and above the calf, where it will seat snugly and securely, without binding or chafing and without any possibility of becoming loosened due to engagement with the trousers or other clothing of the wearer.

If desired, an adjustment buckle may be provided at the juncture 68 in well known manner or elsewhere if desired, though in commercial practice it has been deemed more practical to manufacture the supporters in sizes small, medium and large, thereby avoiding the possibility of engagement of any metallic part with the skin of the wearer.

The present elastic braid is not limited in its use to fabrics of narrow width, but the latter may be of any desired width. For instance, when made relatively wider than shown herein, with one or more suitably located longitudinal openings or divisions, the fabric is particularly useful in certain garments, such as corsets and the like where it is desirable that tension be exerted in different directions; since it will be seen that when the longitudinally divided portions are separated, which may be to even a greater extent than indicated in the modifications illustrated herein, the lines of elastic tension will be at an angle to each other, at both sides of the fabric. This result has heretofore only been obtainable by stitching a plurality of pieces of elastic webbing or the like together along angular lines. The present unitary, smooth, unstitched construction thus affords marked advantages in body encircling garments of various kinds, and in other articles.

The novel constructions shown and described herein may also be formed of woven or other webbing or fabric or other reinforced elastic material.

Many other variations will suggest themselves to those skilled in the art, since the present disclosure makes it clear that any desired number of longitudinal openings may be formed, either wholly or partly in parallel, and each of any desired length, and with any desired spacing transversely or longitudinally, and severed at any point or points transversely or allowed to remain connected as originally formed; all for the production of articles of manufacture of various kinds for which the present elastic braid construction is especially adaptable.

Of course, the improvements specifically shown and described, by which I obtain the above results, can be changed and modified in various ways without departing from the scope of the invention herein disclosed and hereinafter claimed.

What I claim is:

1. Means forming a reinforced crotch at the juncture of the branches of a divided fabric web with the main web body, comprising elongated strands having substantially straight portions of substantial length positioned in the fabric in laterally spaced side-by-side relation and held in said relation by strands transversely thereto, said laterally-spaced strand portions lying at opposite sides of a line dividing the angle between said branches and extending to other portions of the elongated strands of which they form a part and which cross each other at the apex of said angle to form said crotch, from which crossed crotch portions still further portions of the elongated strands extend along said branches, respectively, as continuations of said laterally-spaced and crossed portions.

2. In a braided fabric, in combination, a body portion including longitudinally extending strands and strands extending transversely across the width of the fabric from opposite side edges thereof, said transversely extending strands being interbraided with said longitudinally extending strands and with each other, certain of said longitudinally extending strands crossing each other at a predetermined point, and said transversely extending strands, beyond said point, extending part-way across the width of the fabric at opposite sides of said point whereby to define separated braid appendages integral with said body portion.

3. In an elastic braided fabric, in combination, a body portion including longitudinally extending elastic strands and inelastic strands extending transversely across the width of the fabric from opposite side edges thereof, said inelastic strands being interbraided with said elastic strands and with each other, certain of said elastic strands crossing each other at a predetermined point, and said inelastic strands, beyond said point, extending part-way across the width of the fabric at opposite sides of said point whereby to define separated elastic braid appendages integral with said body portion.

4. In an elastic braided fabric, in combination, a body portion including longitudinally extending elastic strands and inelastic strands extending transversely across the width of the fabric from opposite side edges thereof, said inelastic strands being interbraided with said elastic strands and with each other, certain of said elastic strands crossing each other at predetermined points and said inelastic strands, between said points, extending part-way across the width of the fabric at opposite sides of said points, whereby to define separated elastic braid side sections integral with said body portion.

5. Means forming a reinforced crotch at the juncture of the branches of a divided fabric web comprising strands positioned in the fabric in spaced side-by-side relation by transverse strands and lying at opposite sides of a line dividing the angle between said branches, said first strands being twisted about each other at the apex of said angle to form said crotch and continuing from the crotch along said branches.

6. Means forming a reinforced crotch at the juncture of the branches of a divided ribbed fabric, comprising rib strands positioned in the fabric in spaced side-by-side relation by transverse strands and lying at opposite sides of a line dividing the angle between said branches, said rib strands being twisted about each other at the apex of said angle to form said crotch and continuing from the crotch along the adjacent edges of said branches.

7. An elastic braided fabric composed of longitudinally extending elastic strands and inelastic strands interbraided therewith and extending transversely across the elastic strands from opposite side edges of the fabric, a pair of said elastic strands crossing each other a plurality of times at a predetermined point, and said inelastic strands, beyond said point, extending part-way across the width of the fabric at opposite sides of said point whereby to define separate longitudinally extending elastic braid sections integral with the main body of the fabric.

8. The method of making a braided fabric which includes feeding to a braiding point longitudinally extending strands in predetermined spaced relation with respect to each other; at said braiding point interbraiding other strands with each other and with said longitudinal strands in a transverse direction relative to the latter, to produce a braided fabric; at a predetermined point in the braiding of said fabric transposing adjacent longitudinal strands while discontinuing the interbraiding of said other strands with each other between said transposed elastic strands; and continuing the braiding, so as to divide the braided fabric into a plurality of longitudinally extending sections through a predetermined braiding area.

9. The method of making a braided fabric which includes feeding longitudinally extending strands to a braiding point and there interbraiding other strands with said longitudinal strands in a transverse direction relative thereto; crossing a pair of adjoining longitudinal strands a plurality of times at a predetermined point in the braiding of the length of said fabric and substantially centrally of the width thereof while discontinuing braiding of strands between said crossed elastic strands; and continuing the braiding, so as to bifurcate the braided fabric through a predetermined braiding area.

10. The method of making an elastic braided fabric which includes feeding to a braiding point longitudinally extending elastic strands in predetermined spaced relation with respect to each other; at said braiding point interbraiding other strands with each other and with said elastic strands in a transverse direction relative to the latter; at a predetermined point in the braiding of said fabric, transposing a plurality of opposing adjacent elastic strands while discontinuing the interbraiding of said other strands with each other between said transposed elastic strands; continuing the braiding, so as to divide the braided fabric into a plurality of sections through a predetermined braiding area; and at a second predetermined point in the braiding operation restoring said transposed elastic strands to their original positions while resuming the previously discontinued interbraiding of said other inelastic strands, thereby to unify the fabric.

11. The method of making an elastic braided fabric which includes feeding longitudinally extending elastic strands to a braiding point and there interbraiding other strands with each other and with said elastic strands in a transverse direction relative thereto; crossing a pair of adjacent elastic strands at a predetermined point in the braiding of the length of said fabric and substantially centrally of the width thereof while discontinuing braiding of strands between said crossed elastic strands; continuing the braiding; so as to divide the braided fabric into two sections through a predetermined braiding area; and at a second predetermined point in the braiding operation restoring said crossed elastic strands to their original positions while resuming the previously discontinued interbraiding of said other inelastic strands, thereby to restore the width-continuity of the fabric.

12. The method of making an elastic braided fabric which includes feeding longitudinally extending elastic strands, in predetermined spaced relation with respect to each other, to a braiding point and there interbraiding inelastic strands with each other and with said elastic strands in a transverse direction relative thereto; crossing a pair of adjacent elastic strands at a predetermined point in the braiding of the length of said fabric and substantially centrally of the width thereof while discontinuing the braiding between said crossed elastic strands; continuing the braiding, so as to bifurcate the braided fabric through a predetermined braiding area; and at a second predetermined point in the braiding operation restoring said crossed elastic strands to their original positions while resuming the previously discontinued interbraiding of said inelastic strands, thereby to close the bifurcation and restore the width continuity of the fabric; and then severing the fabric transversely at said divided area.

13. The method of making an elastic lace braid fabric which includes feeding to a braiding point longitudinally extending elastic strands in predetermined spaced relation with respect to each other, at said braiding point interbraiding inelastic strands with each other and with said elastic strands in a transverse direction relative to the latter, to produce a lace-like fabric; at a predetermined point in the braiding of said fabric crossing a pair of adjacent elastic strands while discontinuing the interbraiding of said inelastic strands with each other between said crossed elastic strands; continuing the braiding, so as to divide the braided fabric into a plurality of sections through a predetermined braiding area; and at a second predetermined point in the braiding operation restoring said crossed elastic strands to their original positions while resuming the previously discontinued interbraiding of said inelastic strands, thereby to unify the fabric, and then severing the fabric transversely at said divided area.

GUSTAV GASTRICH.